United States Patent
Tarango et al.

(10) Patent No.: US 11,748,001 B2
(45) Date of Patent: Sep. 5, 2023

(54) TECHNIQUES TO PREDICT OR DETERMINE TIME-TO-READY FOR A STORAGE DEVICE

(71) Applicant: SK hynix NAND Product Solutions Corp., San Jose, CA (US)

(72) Inventors: Joseph D. Tarango, Longmont, CO (US); Jim S. Baca, Longmont, CO (US)

(73) Assignee: SK hynix NAND Product Solutions Corp., San Jose, CA (US)

( * ) Notice: Subject to any disclaimer, the term of this patent is extended or adjusted under 35 U.S.C. 154(b) by 604 days.

(21) Appl. No.: 16/831,689

(22) Filed: Mar. 26, 2020

(65) Prior Publication Data
US 2020/0225857 A1    Jul. 16, 2020

(51) Int. Cl.
G06F 3/00      (2006.01)
G06F 3/06      (2006.01)
G06N 5/04      (2023.01)

(52) U.S. Cl.
CPC .......... *G06F 3/0629* (2013.01); *G06F 3/0616* (2013.01); *G06F 3/0679* (2013.01); *G06N 5/04* (2013.01)

(58) Field of Classification Search
None
See application file for complete search history.

(56) References Cited

U.S. PATENT DOCUMENTS

2021/0081284 A1*    3/2021    Watt ................. G06F 11/076

* cited by examiner

*Primary Examiner* — Midys Rojas
(74) *Attorney, Agent, or Firm* — Byrne Poh LLP

(57) ABSTRACT

Examples may include techniques to predict or determine time-to-ready (TTR) for a storage device. TTR may be predicted or determined based on operating information included in a snapshot associated with a first time interval during operation of the storage device. The TTR predicted or determined indicates an amount of time the storage device will be at an operational state following a power loss recover of the storage device.

19 Claims, 15 Drawing Sheets

*1300*

OBTAIN FIRST OPERATING INFORMATION INCLUDED IN A SNAPSHOT FOR A DATA STORAGE DEVICE, THE SNAPSHOT ASSOCIATED WITH A FIRST TIME INTERVAL DURING OPERATION OF THE DATA STORAGE DEVICE WHILE COUPLED TO A COMPUTE DEVICE
*1302*

PREDICTING, BASED ON THE FIRST OPERATING INFORMATION, A TTR VALUE THAT INDICATES AN AMOUNT OF TIME THE DATA STORAGE DEVICE WILL BE AT AN OPERATIONAL STATE FOLLOWING A POWER LOSS RECOVERY OF THE DATA STORAGE DEVICE
*1304*

DETERMINE WHETHER THE PREDICTED TTR VALUE MEETS A TTR REQUIREMENT FOR BRINGING THE DATA STORAGE DEVICE TO AN OPERATIONAL STATE WITHIN A THRESHOLD TIME
*1306*

CAUSE A CONFIGURATION CHANGE TO THE DATA STORAGE DEVICE BASED ON THE PREDICTED TTR VALUE INDICATING THAT A TIME TO BRING THE DATA STORAGE DEVICE TO THE OPERATIONAL STATE EXCEEDS THE THRESHOLD TIME
*1308*

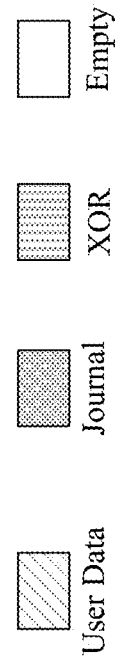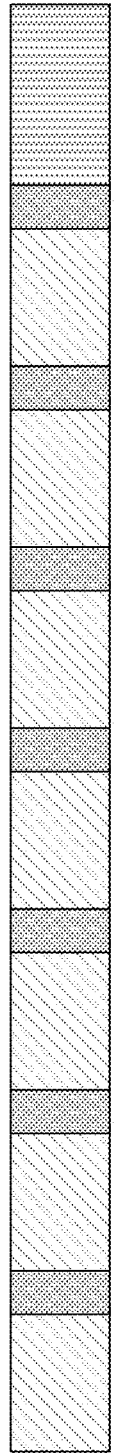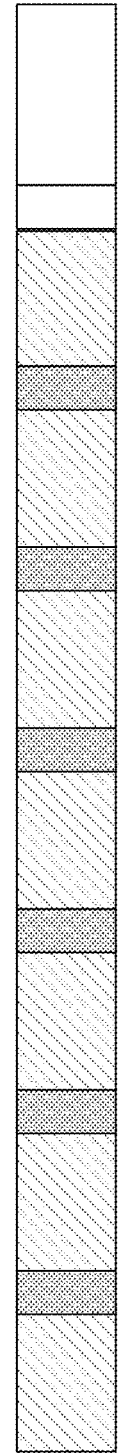
FIG. 6

900

RECEIVE TELEMETRY DATA FOR MULTIPLE DATA STORAGE DEVICES THAT INCLUDES OPERATING INFORMATION INCLUDED IN SEPARATE SNAPSHOTS FOR EACH DATA STORAGE DEVICE FROM AMONG THE MULTIPLE DATA STORAGE DEVICES, THE SEPARATE SNAPSHOTS ASSOCIATED WITH A FIRST TIME INTERVAL DURING OPERATION OF THE MULTIPLE DATA STORAGE DEVICES
902

DETERMINE INDIVIDUAL TTR VALUES FOR THE MULTIPLE DATA STORAGE DEVICES BASED ON THE OPERATING INFORMATION, THE INDIVIDUAL TTR VALUES TO INDICATE AN EXPECTED AMOUNT OF TIME THAT A CORRESPONDING DATA STORAGE DEVICE IS TO BE AT AN OPERATIONAL STATE FOLLOWING A POWER LOSS RECOVERY OF THE CORRESPONDING DATA STORAGE DEVICES
904

SEND THE INDIVIDUAL TTR VALUES TO THE CORRESPONDING DATA STORAGE DEVICES
906

*FIG. 9*

Storage Medium 1000

Computer Executable Instructions for 900

```
OBTAIN FIRST OPERATING INFORMATION INCLUDED IN A SNAPSHOT
FOR A DATA STORAGE DEVICE, THE SNAPSHOT ASSOCIATED WITH A
FIRST TIME INTERVAL DURING OPERATION OF THE DATA STORAGE
DEVICE WHILE COUPLED TO A COMPUTE DEVICE
1302
```

```
PREDICTING, BASED ON THE FIRST OPERATING INFORMATION, A TTR
VALUE THAT INDICATES AN AMOUNT OF TIME THE DATA STORAGE
DEVICE WILL BE AT AN OPERATIONAL STATE FOLLOWING A POWER
LOSS RECOVERY OF THE DATA STORAGE DEVICE
1304
```

```
DETERMINE WHETHER THE PREDICTED TTR VALUE MEETS A TTR
REQUIREMENT FOR BRINGING THE DATA STORAGE DEVICE TO AN
OPERATIONAL STATE WITHIN A THRESHOLD TIME
1306
```

```
CAUSE A CONFIGURATION CHANGE TO THE DATA STORAGE DEVICE
BASED ON THE PREDICTED TTR VALUE INDICATING THAT A TIME TO
BRING THE DATA STORAGE DEVICE TO THE OPERATIONAL STATE
EXCEEDS THE THRESHOLD TIME
1308
```

FIG. 13

Storage Medium 1400

Computer Executable Instructions for 1300

*FIG. 14*

TECHNIQUES TO PREDICT OR DETERMINE TIME-TO-READY FOR A STORAGE DEVICE

TECHNICAL FIELD

Examples described herein are generally related to techniques to predict or determine time-to-ready (TTR) following deployment of a storage device in an operating environment.

BACKGROUND

Data storage devices such as, but not limited to, solid state drives are typically manufactured and sold to customers with a configuration that provides a baseline level of performance for a wide range of potential workloads (e.g., a set of operations including data access operations, performed by a compute device executing a software application). The manufacture configuration may statically define settings for features such as time-to-ready (TTR). TTR indicates an expected total time for host computing device to establish a link with a storage device to enable a logical state that allows for storage device operations or allows for a readiness of the storage device to accept commands for storage device operations (e.g., is in an operational state). A statically defined setting for TTR may establish time bands for best case/shortest TTR based on a warm start/boot of the storage device or worst case/longest TTR based on a cold start/boot of the storage device.

BRIEF DESCRIPTION OF THE DRAWINGS

FIG. 6 illustrates example bands.
FIG. 9 illustrates an example first logic flow.
FIG. 10 illustrates an example first medium.
FIG. 13 illustrates an example second logic flow.
FIG. 14 illustrates an example second medium.

DETAILED DESCRIPTION

A time bounded, statically defined setting for a storage device's TTR is typically set to ensure a host computing device (e.g., a server) coupled to the storage device is in an operational state and ready for operation in an acceptable amount of time. A type of storage device including non-volatile memory such as NAND memory may be a solid state drive (SSD). An SSD may struggle to meet power on ready specifications for TTR in some types of deployment environments such as in a datacenter. A datacenter deployment may include operators power cycling SSDs in safe (orderly power on) and unsafe (unexpected power loss) environments. Hence, the need for time bounded setting for SSDs deployed in these types of environments. However, these time bounds change over an operating life of an SSD since TTR is directly affected by a phenomenon associated with SSDs referred to as write amplification (WA). WA is defined as a ratio of writes committed to physical memory of an SSD to writes received from a host. WA typically tends to increase as an SSD ages and spare space used for defragmentation operations or garbage collection decreases. For example, in cases of low spare space, a defragmentation WA ratio or factor (WAF) may go from around 6 to around 58 when spare space drops to around 8%. A normalized TTR value for multiple SSDs in a rack in a datacenter that accounts for how TTR is affected by increased WA as SSDs age may mean an entire rack of devices may be incur a worst case WA effect. Also, operators that are limited to using statically defined values for TTR do not have a way to dynamically target respective TTRs for SSDs deployed in systems that reflect actual usage and changing operating environments.

According to some examples, problems associated with statically defined values for TTR may manifest in at least three scenarios; (1) operator planned power cycling, (2) power loss events from brown out events, or (3) missed windows of enumeration (storage device doesn't meet allotted time window for coming online). The first two scenarios may operate within the above-mentioned time bounds, yet statically defined values for TTR may not reflect actual operating conditions. The third scenario may present problems related to an appearance of a de-enumeration event that leads to a storage device being returned to a manufacture when the device may still be functional if the TTR could be have been dynamically tuned based on actual operating conditions and aging storage devices.

Figure 1:
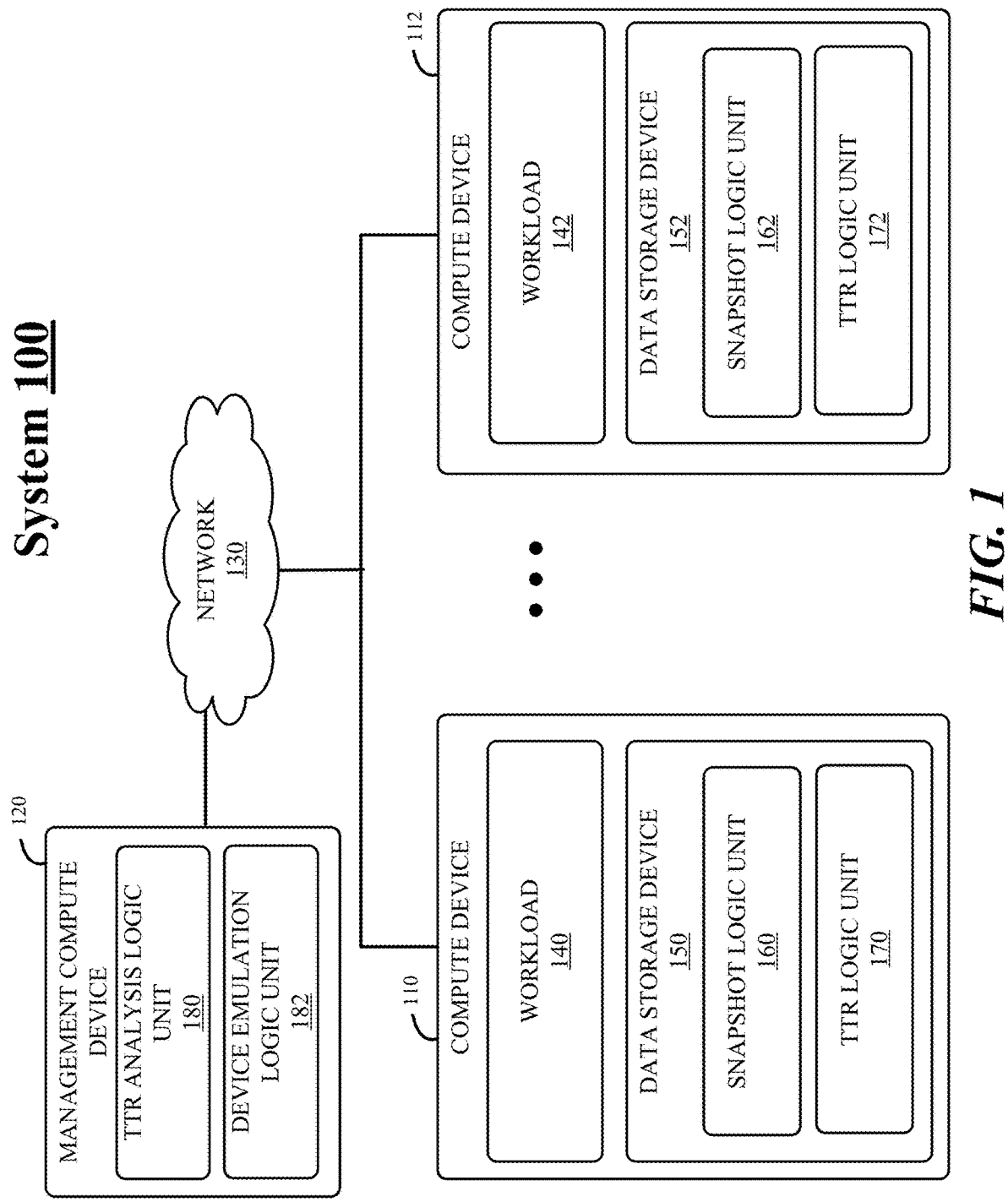
FIG. 1 illustrates an example first system.

FIG. 1 illustrates an example system 100. According to some examples, as shown in FIG. 1, system 100 includes a set of compute devices 110, 112 in communication with a management compute device 120 (e.g., a compute device used by a management entity such as datacenter orchestrator) through a network 130. The compute devices 110, 112, in some examples, may be located in a datacenter. Compute devices 110, 112 may be arranged to execute respective workloads 140 and 142 (e.g., sets of operations, such as applications, in virtual machines or containers) on behalf of a customer and/or operator of system 100 (not shown). While two compute devices 110, 112 and two data storage devices 150, 152 are shown for simplicity, it should be understood that examples are not limited to that the number of compute devices and/or data storage devices.

According to some examples, workloads 140, 142, in operation, may request data from and store data to a corresponding data storage device 150, 152 in each compute device 110, 112. One workload (e.g., workload 140) may request only a subset of the available data access operations that the data storage device 150 is capable of performing and/or may exhibit a particular pattern in requesting access to data available on data storage device 150. For example, workload 140 may utilize one of a set of available error correction algorithms and/or encryption algorithms that the data storage device 150 is capable of performing and may typically read relatively large data files (e.g., for media streaming), while workload 142 may utilize a different set of available error correction algorithms and/or encryption algorithms that the data storage device 152 is capable of performing, and may exhibit a different pattern of data access (e.g., reading smaller data sets and writing to data storage device 150 more frequently than the workload 140 writes to the data storage device 150).

In some examples, data storage devices 150, 152 may produce telemetry data including operational information such as, but not limited to, historical snapshot data indicative of configurations or performance metrics, such as speeds at which operations are performed, malfunctions of one or more components, spare space, etc. Each historical snapshot associated with respective time intervals during operation of data storage devices 150, 152. For these examples, telemetry data including the operational information for data storage device 150, 152 may be sent by each corresponding compute device 110, 112 through the network 130 to management compute device 120 for analysis (e.g., data mining). In performing the data mining, management compute device 120 may utilize a time-to-ready (TTR) analysis logic unit 180, which may be embodied as any device or circuitry (e.g., a processor, a programmable logic chip, application specific integrated chip (ASIC), etc.) or software configured to predict and/or tune TTR values or settings for individual or groups of storage devices in system 100 based, at least in part, on historical snapshot data. The historical snapshot data may indicate configurations and/or performance metrics from many different data storage devices in system 100 over a given time interval. Management compute device 120 may also utilize a device emulation logic unit 182, which may be embodied as any device or circuitry (e.g., a processor, a programmable logic chip, ASIC, etc.) or software configured to emulate, using similar configurations and/or performance metrics provided in received telemetry data to assist TTR analysis logic unit 180 in tuning TTR values or settings based on changing one or more operating parameters, e.g., related to workloads 140, 142 being executed by compute devices 110, 112.

According to some examples, each data storage device 150, 152 may include a corresponding snapshot logic unit 160, 162 and TTR logic unit 170, 172. Snapshot logic unit 160, 162 and TTR logic unit 170, 172 may be embodied as software or circuitry (e.g., co-processor, microcontroller, ASIC, programmable logic chip (field programmable gate array (FPGA)), etc.). For these examples, snapshot logic units 160, 162 may be configured to monitor and gather historical snapshots of configurations and/or performance metrics (e.g., spare space, WA, trim operations, garbage collection, etc.) of the data storage device 150, 152 while these devices serve or support the needs of workload 140, 142. TTR logic units 170, 172 may use corresponding gathered historical snapshots to predict and/or dynamically tune corresponding TTR values for data storage devices 150, 152. As described more below, expected or predicted time intervals associated with hardware and logical state ready times may be used as inputs to determine a TTR value.

In some examples, historical snapshots gathered by snapshot logic units 160, 162 and/or the predicted TTR values may be sent as telemetry data to management compute device 120. TTR analysis logic unit 180 of management compute device 120 may use that telemetry data and/or predicted TTR values to determine system TTR values or settings for all or at least a portion of system 100. Management compute device 120 may send, for example, determined system TTR value(s) to compute devices 110, 112 and/or data storage devices 150, 152. The determined system TTR value(s) may take into consideration how these storage devices are likely to operate within the entire system 100.

According to some examples, TTR values or settings determined at management compute device 120 or at data storage devices 150, 152 may enable a way to target TTR values for either the entire system 100 or for respective compute devices 110, 120 in order to optimize use of data storage devices such as data storage devices 150, 152. For example, in a staggered boot system, a few critical data storage devices may have TTR values that meet system boot/operating system (OS) load constraints; while other, non-critical data storage devices become ready. In other words, the critical data storage devices may have TTR values associated with shorter times to bring these data storage devices to an operational state compared to non-critical data storage devices. The time differential for TTR values may allow for this type of staggered booting. A staggering of storage device boots may result in an increase in endurance/performance of at least some storage devices by allowing or accommodating different TTR values and may also have an additional benefit of reducing peak power for a staggered boot versus a relatively higher peak power to boot all data storage devices at around the same time.

In some examples, events associated with decreasing space for types of data storage devices such as SSDs that cause increased write amplification (WA) may be anticipated or predicted to have an impact on a data storage device's predicted TTR value. For example, based on gathered snapshot data by snapshot logic unit 160 indicating increasing WA due to a decreasing amount of spare space, TTR logic unit 170 may calculate predicted TTR values that indicate possible unacceptable times for a TTR of data storage device 150 following a power loss recovery (e.g., due to a sudden power loss or power down event). The unacceptable times, for example, may be based on a TTR requirement for bringing data storage device 150 to an operational state within a threshold time (e.g., set by compute device 150 and/or management compute device 120). TTR logic unit 170 may send an indication to logic and/or features at data storage device 150 (e.g., a controller) that additional spare or free space is needed to avoid an unacceptable TTR value. Responsive to this indication, the logic and/or features at data storage device 150 may take efforts to build up free or spare space storage capacity. Snapshot logic unit 160 may gather additional snapshot data following this buildup of free or spare space storage capacity. TTR logic unit 170 may then use the gathered additional snapshot data to make another prediction of data storage device 150's TTR based on this changed operating parameter to determine whether TTR requirements can now be met.

According to some examples, an ability to cause changes to a configuration of data storage device 150 based on TTR value predictions enables TTR logic unit 170 to dynamically tune TTR values for data storage device 150. This ability to dynamically tune TTR values may allow for data storage device 150 to be in sync with an actual operating environment for workload 140 as well as for other workloads supported by compute or data storage devices included in system 100. Also, an ability to enable a dynamic tune of TTR values may also allow for faster boot times and/or device discovery for data storage device 150 in relation to data storage devices included in system 100 since system boot times in many enterprise or datacenter deployments may be longer than a dynamical tuned TTR value predicted by TTR logic unit 170 based on historical snapshots gathered by snapshot logic unit 160 and responsive to configuration changes to data storage device 150.

Figure 2:
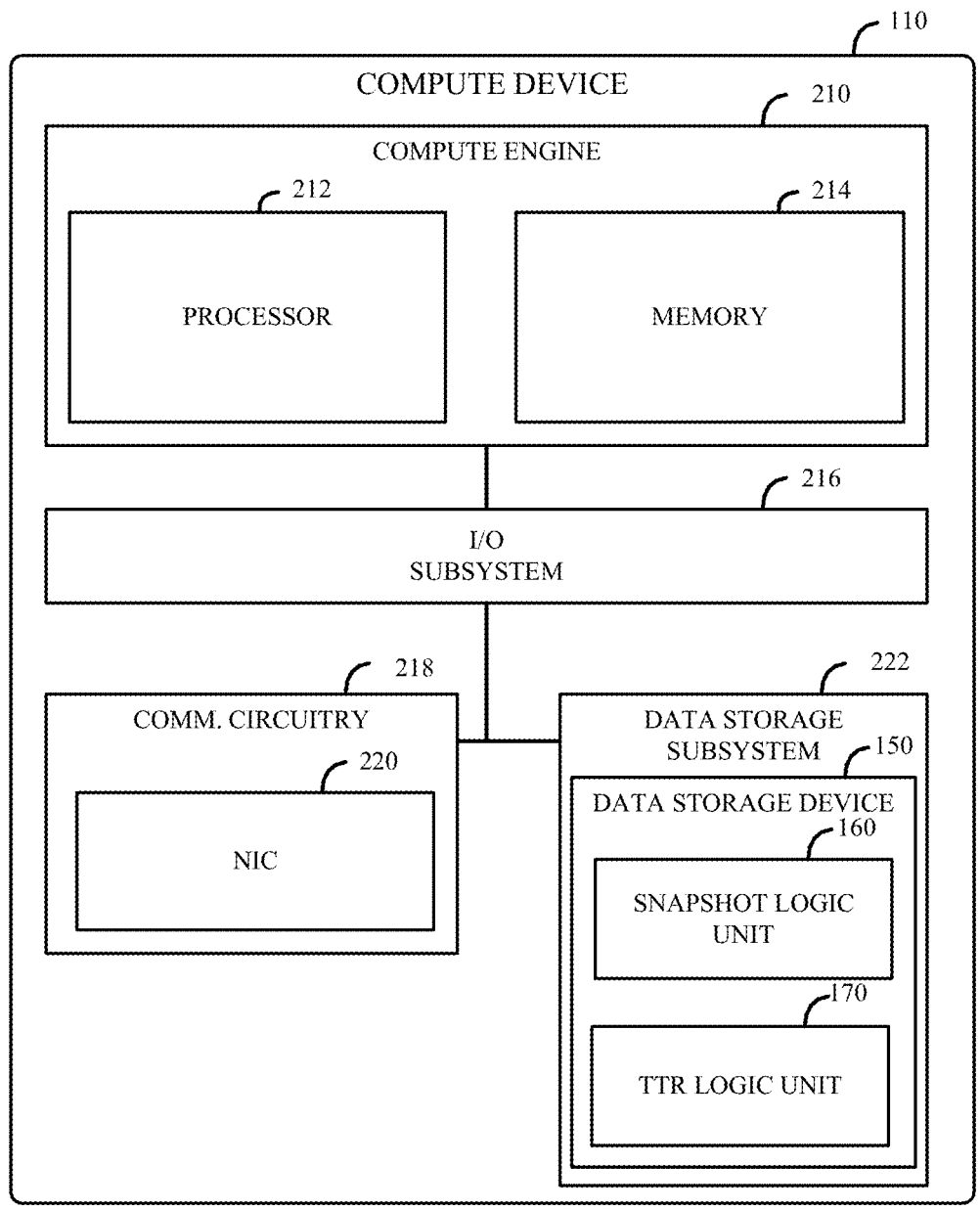
FIG. 2 illustrates an example compute device.

FIG. 2 illustrates example compute device 110. In some examples, as shown in FIG. 2, compute device 110 includes a compute engine (also referred to herein as "compute engine circuitry") 210, an input/output (I/O) subsystem 216, communication circuitry 218, and a data storage subsystem 222. Compute device 110 may include other or additional components, such as those commonly found in a computer (e.g., a display, peripheral devices, etc.). Additionally, in some examples, one or more of the components shown in FIG. 2 may be incorporated in, or otherwise form a portion of, another component. Compute engine 210 may be embodied as any type of device or collection of devices capable of performing various compute functions described below. In some examples, compute engine 210 may be embodied as a single device such as an integrated circuit, an embedded system, programmable logic chip (e.g., FPGA), a system-on-a-chip (SOC), or other integrated system or device.

According to some examples, as shown in FIG. 2, compute engine 210 may include a processor 212 and a memory 214. Processor 212 may be any type of processor capable of performing the functions described herein. For example, processor 212 may be a multi-core processor(s), a microcontroller, or other processor or processing/controlling circuit. In some examples, processor 212 may include, or be coupled to an FPGA, an ASIC, reconfigurable hardware or hardware circuitry, or other specialized hardware to facilitate performance of the functions described herein.

In some examples, memory 214 may be any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, JESD209-4 for LPDDR4 and JESD209-5 for LPDDR5. Such standards (and similar yet-to-be published standards, e.g., DDR5 SDRAM) may be referred to as DDR-based standards and communication interfaces of the storage devices that implement such standards may be referred to as DDR-based interfaces.

According to some examples, memory 214 may include one or more memory devices or dies that are block addressable memory devices, such as those based on NAND or NOR technologies. Memory 214 may also include one or more memory devices that may also include a three dimensional crosspoint memory device or other types of byte addressable non-volatile memory devices. In some examples, memory 214 may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of non-volatile memory.

According to some examples, all or a portion of memory 214 may be integrated into processor 212. In operation, memory 214 may store various software and data used during operation of compute device 110 such as applications, libraries, or device drivers.

In some examples, compute engine 210 is communicatively coupled to other components of the compute device 110 via input/output (I/O) subsystem 216. I/O subsystem 216 may include circuitry and/or logic to facilitate I/O operations with compute engine 210 and/or other components of compute device 110. For example, I/O subsystem 216 may be embodied as, or otherwise include, memory controller hubs, I/O control hubs, integrated sensor hubs, firmware devices, communication links (e.g., point-to-point links, bus links, wires, cables, light guides, printed circuit board traces, etc.), and/or other components and subsystems to facilitate I/O operations. I/O subsystem 216 may form a portion of an SoC and be incorporated, along with processor 212, memory 214, or other components of compute device 110.

According to some examples, communication circuitry 218 may include any communication circuit, device, or collection thereof, capable of enabling communications over a network (e.g., network 130) between compute device 110 and another compute device (e.g., management compute device 120, etc.). Communication circuitry 218 may be configured to use any one or more communication technologies (e.g., wired or wireless communications) and associated protocols (e.g., Ethernet, Bluetooth®, Wi-Fi®, etc.) to effect such communication.

In some examples, communication circuitry 218, as shown in FIG. 2, includes a network interface controller (NIC) 220. NIC 220 may be one or more add-in-boards, daughter cards, network interface cards, controller chips, chipsets, or other devices that may be used by compute device 110 to connect with another compute device. NIC 220 may be embodied as part of an SoC that includes one or more processors, or included on a multichip package that also contains one or more processors.

According to some examples, data storage subsystem 222 may include one or more data storage devices. As shown in FIG. 2, data storage subsystem 222 includes data storage device 150. Data storage device 150 may be any type of memory/storage device configured for short-term or long-term storage of data such as, for example, memory devices and circuits, memory cards, hard disk drives, solid-state drives, or other types of data storage devices. Data storage device 150 may include a system partition that stores data and firmware code for data storage device 150 and configuration data for features of data storage device 150. Data storage device 150 may also include one or more operating system partitions that store data files and executables for operating systems. Additionally, as shown in FIGS. 1 and 2, data storage device 150 includes snapshot logic unit 160 and TTR logic unit 170 and as described with reference to FIG. 1.

Figure 3:
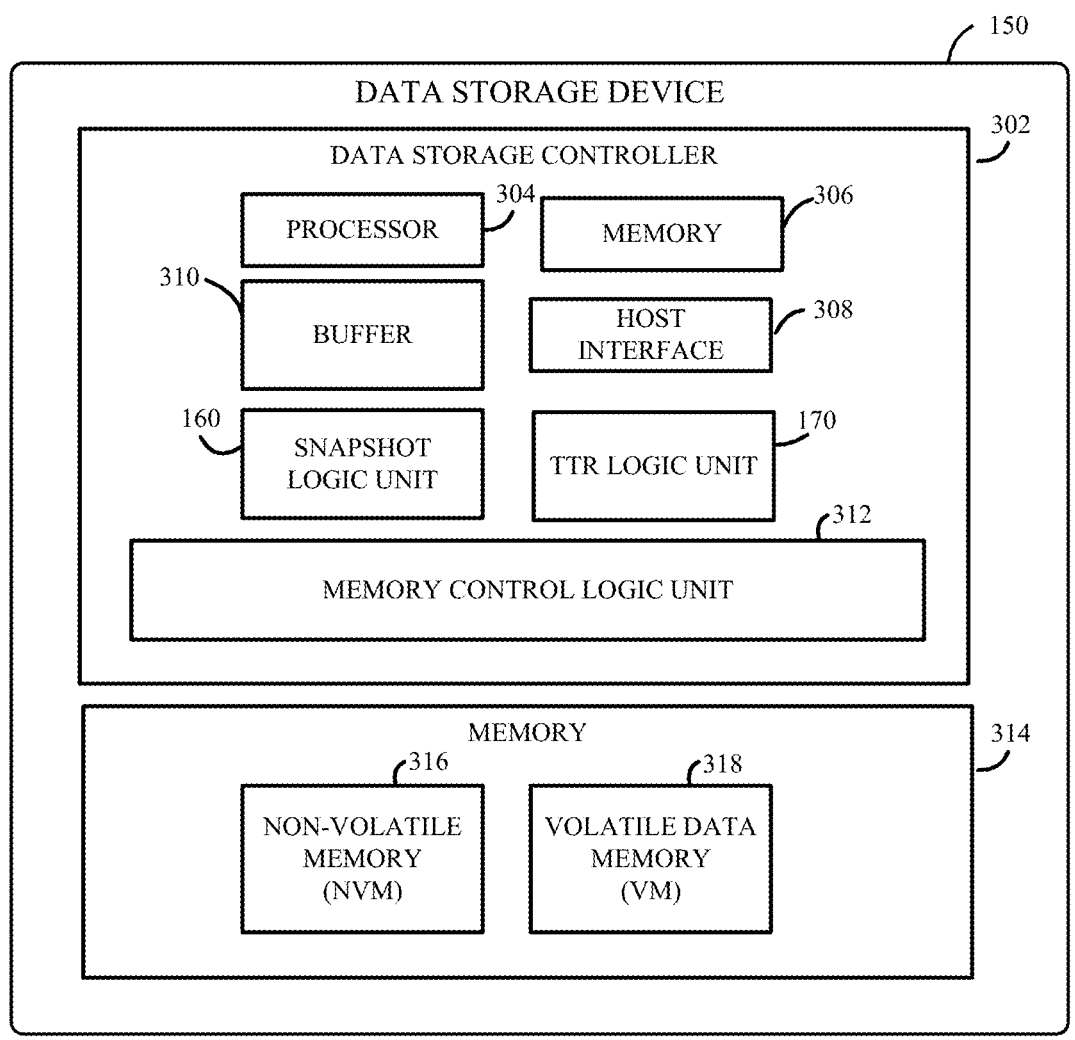
FIG. 3 illustrate an example data storage device.

FIG. 3 illustrates example data storage device 150. In some examples, as shown in FIG. 3, data storage device 150 includes a data storage controller 302 and a memory 314, which includes a non-volatile memory 316 and a volatile memory 318. Data storage controller 302 may be arranged as any type of control device, circuitry or collection of hardware devices capable of controlling access to memory 314 (e.g., in response to requests from a host device, such as the compute device 110) and performing related operations to access memory 314 (e.g., pre-fetching data before that data is requested by the host, performing error correction operations on data, encrypting or decrypting data, garbage collection, etc.), as well as monitoring usage patterns of a workload (e.g., workload 140) and adjusting features of data storage device 150 to more efficiently (e.g., tune TTR) serve the needs of the workload.

According to some examples, data storage controller 302 includes a processor (or processing circuitry) 304, a memory 306, a host interface 308, snapshot logic unit 160, TTR logic unit 170, a buffer 310, and a memory control logic unit 312. In some examples, processor 304, memory control logic unit 312, and memory 306 may be included in a single die or integrated circuit. Data storage controller 302 may include additional, not shown, devices, circuits, and/or components commonly found in a controller of a data storage device.

In some examples, processor 304 may be embodied as any type of processor capable of performing the functions disclosed herein. For example, processor 304 may be a single or multi-core processor(s), digital signal processor, microcontroller, or other processor or processing/controlling circuit. Similarly, memory 306 may be embodied as any type of volatile and/or non-volatile memory or data storage capable of performing the functions disclosed herein. According to some examples, local memory 306 may store firmware and/or instructions executable by processor 304 to perform the described functions of logic and/or features of data storage controller 302. Processor 304 and memory 306 may form a portion of an SoC and be incorporated, along with other components of data storage controller 302, onto a single integrated circuit chip.

According to some examples, host interface 308 may also be embodied as any type of hardware processor, processing circuitry, input/output circuitry, and/or collection of components capable of facilitating communication of data storage device 150 with a host device (e.g., compute device 110) or service (e.g., workload 140). That is, host interface 308 may be arranged to establish an interface for accessing data stored on data storage device 150 (e.g., stored in memory 314). Host interface 308 may be configured to use various communication protocols and/or technologies to facilitate communications with data storage device 150 depending on the type of data storage device. For example, host interface 308 may be configured to communicate with a host device or service using Serial Advanced Technology Attachment (SATA), Peripheral Component Interconnect express (PCIe), Non-Volatile Memory express (NVMe), Serial Attached SCSI (SAS), Universal Serial Bus (USB), and/or other communication protocols and/or technologies related to access of a storage device.

In some examples, as shown in FIG. 3, data storage controller 302 may also include a buffer 310. Buffer 310 may be a type of volatile memory used by data storage controller 302 to temporarily store data that is being read from or written to memory 314. A particular size or capacity of buffer 310 may be dependent on the total storage size of memory 314.

According to some examples, as shown in FIG. 3, data storage controller 150 also include memory control logic unit 312. Memory control logic unit may be hardware circuitry and/or devices (e.g., a processor, an FPGA, an ASIC, etc.) configured to control read/write access to a particular storage location or address of memory 314.

Figure 4:
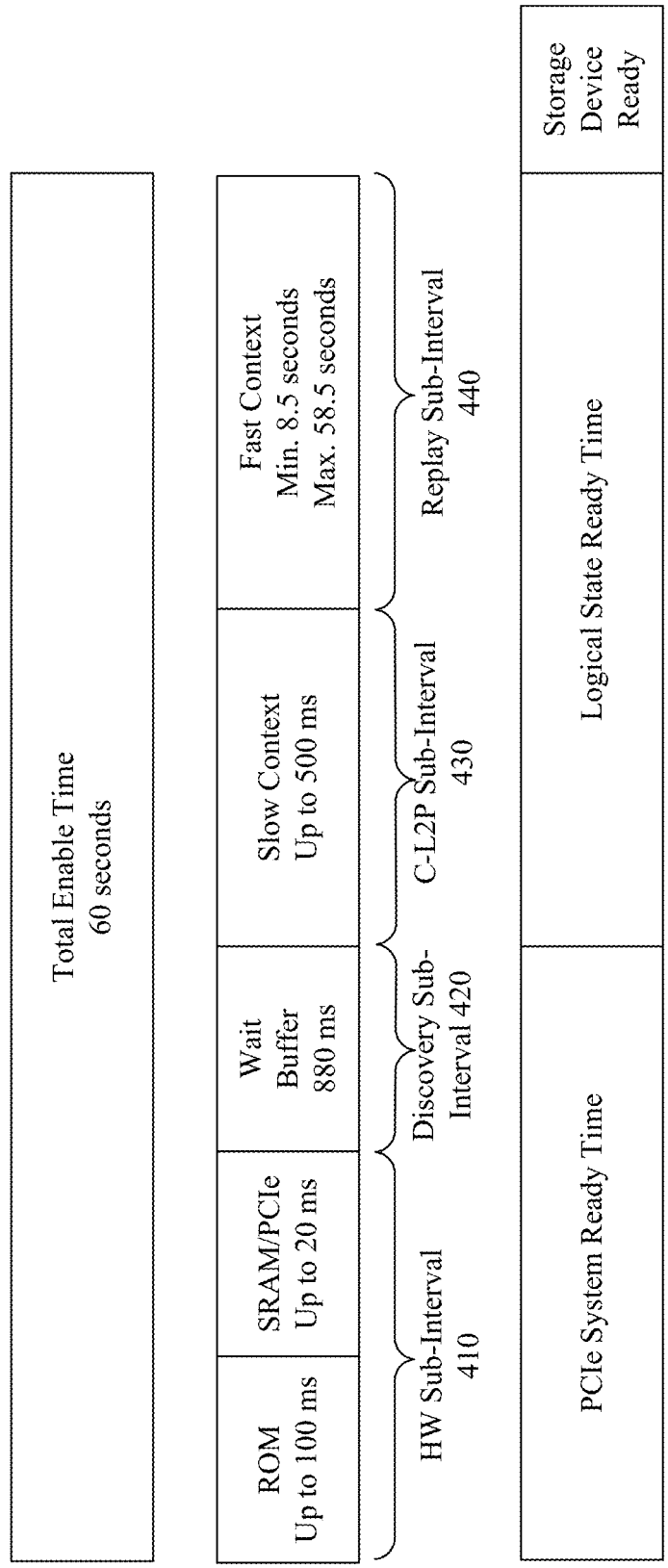
FIG. 4 illustrates an example diagram.

FIG. 4 illustrates an example diagram 400. In some examples diagram 400 depicts various sub-intervals that may be included in a maximum TTR requirement for a data storage device that may be set to an example 60 seconds. In other words, 60 seconds may be an example threshold time to bring a data storage devices to an operational state. Examples are not limited to a 60 second threshold time. The data storage device, for example, may be an SSD that may be configured to operate using NVMe protocols and may be referred to as an NVMe SSD or NVMe storage device. For these examples, a TTR value for the NVMe SSD may be predicted based on example equation 1.

$$TTR=HW+Discovery+Slow\ Context\ Load+Fast\ Context\ Load \qquad Eq.\ 1:$$

In some examples, the HW input for example equation 1 may be based on constant times that are associated with initializing hardware components of the NVMe SSD for operation such as accessing read only memory (ROM) to obtain initialization firmware instructions to determine how to initialize SRAM used by a controller for the NVMe SSD (e.g., as a buffer) and how to configure PCIe interfaces (e.g., link training) that couple with a host computing device and/or storage media included in the NVMe SSD. For example, if data storage device 150 as shown in FIG. 3 was configured to be an NVMe SSD, the HW input accounts for time needed for processor 304 of data storage controller 302 to read memory 306 to access instructions to initialize buffer 310, initialize host interface 308 that includes a PCIe interfaces and initialize memory control logic unit 312 that may also include a PCIe interface coupled to memory 314. For these examples, HW sub-interval 410 may include these two HW-based initialization events. FIG. 4 shows that the ROM portion of HW sub-interval 410 is allotted a time of up to 100 milliseconds (ms) and the SRAM/PCIe portion may have an allotted time of up to 20 ms.

According to some examples, the discovery input for example equation 1 may be based on an amount of time for the NVMe SSD to be discovered, for example, by a host device driver. For these example, the host device driver may issue configuration requests to a wait buffer (e.g., buffer 310) of the NVMe SSD and NVMe SSD may pull the configuration requests from the wait buffer. For these examples, discovery sub-interval 420 includes wait buffer. FIG. 4 shows that wait buffer is allotted 880 ms. The 880 ms indicates an amount of time that the NVMe SSD is given to receive and complete configuration requests.

In some examples, the slow context load input of example equation 1 may be based on an amount of time to load a logical to physical context (C-L2P). In example operations of a NVMe SSD, several basic events are expected including read and write operations. Due to systems being power cycled, there is a need to ensure all writes being executed are completed in the event of an immediate power loss. In order to ensure in-process write commands complete, a time frame window may be expanded by adding capacitors that take into account the energy (joules, not power) for static/dynamic power requirements to complete a maximum capacity of outstanding commands. To adequately recover from a power loss event, in-process operations may be saved to a single location such that on recovery the appropriate data structures may be reloaded or replayed to continue back from a previous coherency point. A single coherency point requires a Rosetta stone of logical and physical block addresses, in which, are saved to a location referred to as a C-L2P. The C-L2P maintains a static compressed version of a runtime logical to physical (L2P) table from a last complete save. Since a runtime L2P table may be continuously changing, the context may be incrementally saved in bursts such that customer requirements may be maintained in quality of service (QoS) and performance uniformity. Also, in order to track a coherency point, a complete C-L2P and an in-progress C-L2P needs to be maintained. Upon a power loss recovery, a start from the last valid C-L2P is initiated to recreate all of writes that have occurred since then by reading the content written and updating the runtime L2P. Since the C-L2P updating is potentially an infinite series of writes to a maximum cycle count, a target to save the events may be such that a C-L2P budget is set for a given interval that enables a balance of performance, maximum TTR, and C-L2P related write amplification. For these examples, C-L2P sub-interval 430 includes slow context. FIG. 4 shows that slow context is allotted a time of up to 500 ms.

In some examples, the fast context load input of example equation 1 may be based on a replay that reconstructs non-blocking portions of memory included in an NVMe SSD by beginning replay from a pointer where a context save was started. Band journals (described more below) may be read from closed sections of a given band (also described more below). Content in a memory portion without a journal may be rebuilt using a logical block address (LBA) tag. For these examples, a limit to a number of bands replayed during replay sub-interval 440 may be set to meet maximum TTR requirements and as shown in FIG. 4, fast context may be allotted a minimum of 8.5 seconds and a maximum of 58.5 seconds. The maximum of 58.5 seconds, for example, limits the number of bands replayed. The large time range associated with a fast context load input compared to other inputs makes limiting the number of bands replayed as the most impactful or adjustable input to meet maximum TTR requirements.

According to some examples, a combination of HW sub-interval 410 and discovery interval 420 may be referred to as a "PCIe system ready time" as indicated in FIG. 4. Also, a combination of C-L2P sub-interval 430 and replay sub-interval 440 may be referred to as "logical state ready time".

Figure 5:
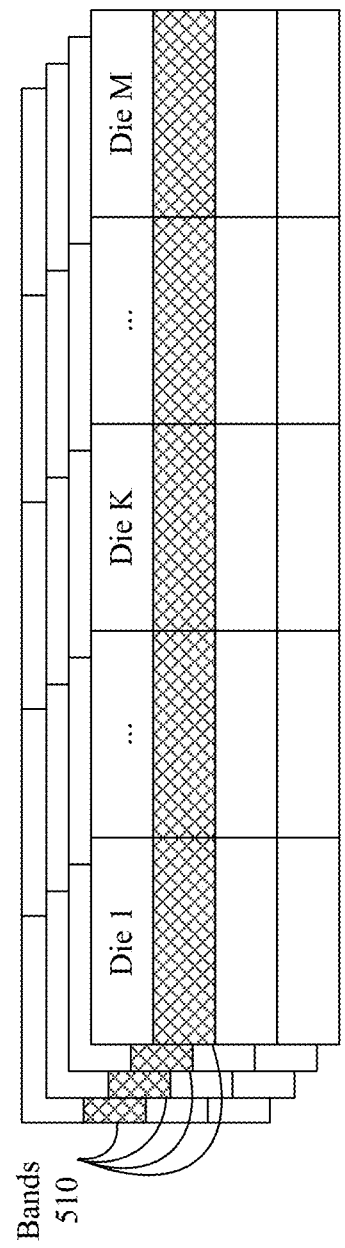
FIG. 5 illustrates an example storage media.

FIG. 5 illustrates an example storage media 500. In some examples, as shown in FIG. 5 storage media may be a persistent or non-volatile storage media and may include multiple media die (e.g., Die 1 . . . Die K . . . Die M) with a storage structure which spans the media die. For example, the granularity of the elements may be of disjoint size so the interaction between the blocks are staged such that the greatest common denomination may correspond to a transitioning set (TS) referred to as a band. FIG. 5 shows example bands 510 spanning across multiple media die A unique feature of a band is that it consists of concurrent erase blocks (EBs) for the media technology to ease meta tracking. Some implementations may use an indirection table to ensure band collections are optimized based on storage media rules related to data integrity.

FIG. 6 illustrates example bands 600. In some examples, as shown in FIG. 6, bands 600 includes a closed band 610 and an open band 620. Bands 600 may span across multiple media die in a similar way as described above for bands 510 shown in FIG. 5. For these examples, the primary difference between closed band 610 and open band 620 is that closed band 610 has data written to all blocks included in this band as well as has XOR parity data written for data integrity and error correction. Meanwhile, open band 620 still has at least one empty block and no XOR parity data. The diagonal patterns may represent user data written to a block in a band, the dotted patterns may represent corresponding journal data and the vertical pattern may represent XOR parity data.

According to some examples, distributed journal data included in closed band 610 may be used to replay or reconstruct user data stored in blocks included in closed band 610 following a power loss recovery event of a data storage device that includes media die that includes bands 600. Each journal includes a summary of active logical to physical entries. For open band 620, uncompleted or empty journals may be rebuilt and then used for replay or reconstruction of user data in blocks included in open band 620.

Figure 7:
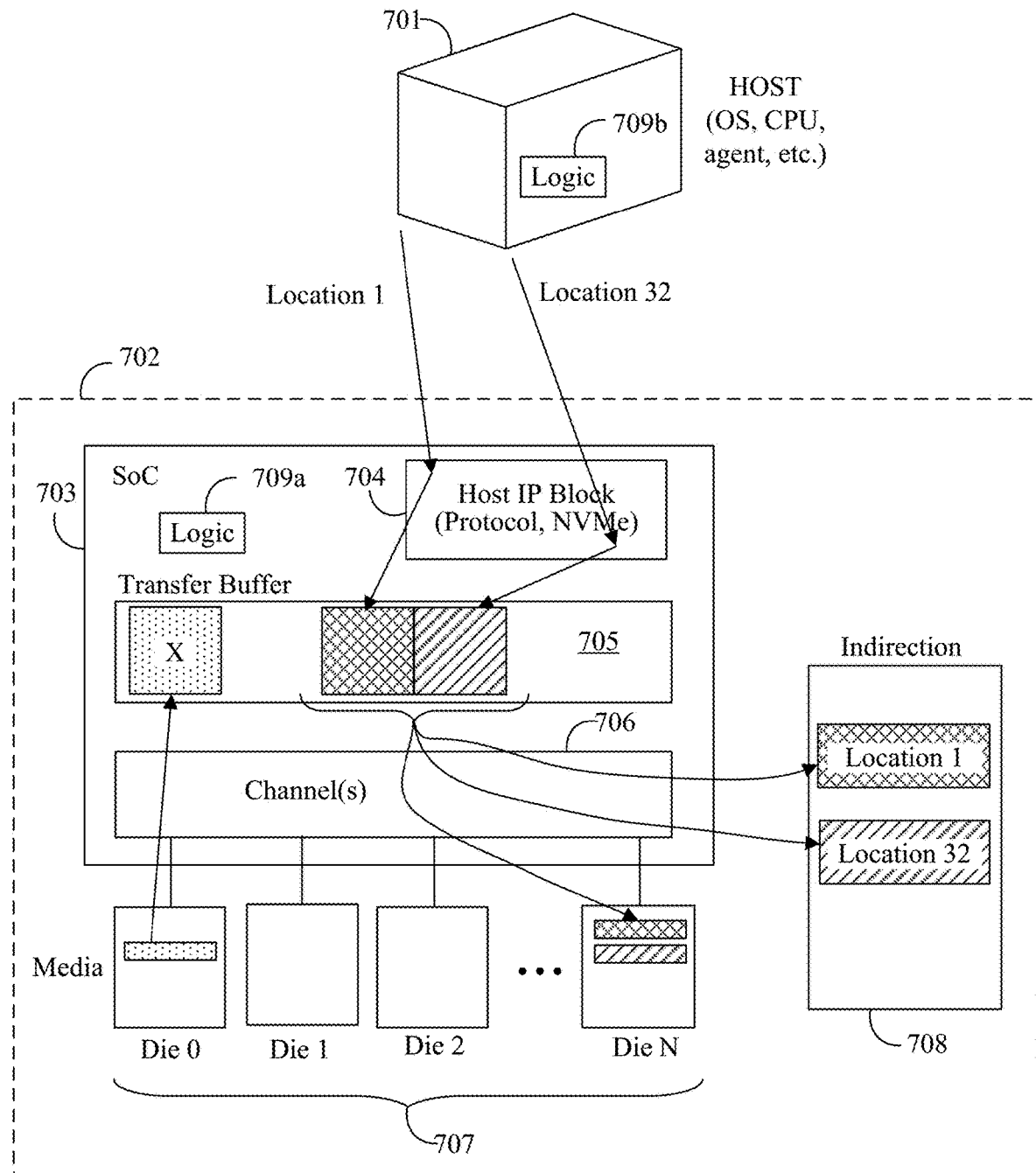
FIG. 7 illustrates an example second system.

FIG. 7 illustrates an example system 700. In some examples, as shown in FIG. 7, system 700 may include a host 701 (e.g., CPU, OS, agent, etc.) communicatively coupled (e.g., wired or wirelessly) to a data storage device 702 (e.g., an SSD). Data storage device 702 may include a controller 703 (e.g., which may be implemented on a SoC) which includes a host IP block 704 (e.g., to support an interface, protocol, NVMe, etc.), a transfer buffer 705, and one or more channel(s) 706. Channel(s) 706 may be coupled to persistent or non-volatile storage media 707 (e.g., Die 0 through Die N). A host access request (e.g., directed to Location 1, Location 32, etc.) may go through a transfer buffer 705 to media 707 based on entries in an indirection table 708. Some transfers X may go directly from transfer buffer 705 to media 707 through channel(s) 706. Transfer buffer 705 may include volatile and/or non-volatile types of memory. A level of indirection (e.g., indicated in indirection table 708) may include a multiple level cascading system where host address space is one level, another level may include internal to physical media mapping, and an additional level of media external scope to internal media extra block re-mapping. Each media level may also consist of a similar type to disjoint media technologies to mask external latency. A host protocol may include any suitable technology including current or future protocols (e.g., NVMe, SCSI, SAS, SATA, etc.).

According to some examples, controller 703 and/or host 701 may further include logic 709a and 709b to manage data storage device 702. In one example, logic 709a may be configured to receive a request (e.g., from host 701) to provide snapshot information gathered during operation of data storage device 702 to indicate configuration or performance metrics. Host 701 may forward this snapshot information to a management entity (not shown) of a network or datacenter that includes host 701. As mentioned above for FIG. 1, the management entity may provide information for adjusting or tuning a TTR setting for data storage device 702 based, at least in part, on configuration or performance metrics for multiple data storage devices. The TTR information, for example, provided to logic 709b at host 701 for logic 709b to use in restart operations following a power loss recovery event. In another example, logic 709a may be configured to receive a request (e.g., from host 701) to predict its own TTR setting based on configuration or performance metrics of data storage device 702. For this other example, logic 709a may provide the predicted TTR setting to logic 709b at host 701. Logic 709b may then use the predicted TTR setting to assess whether data storage device 702 is able to meet performance requirements following a power loss recovery event.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
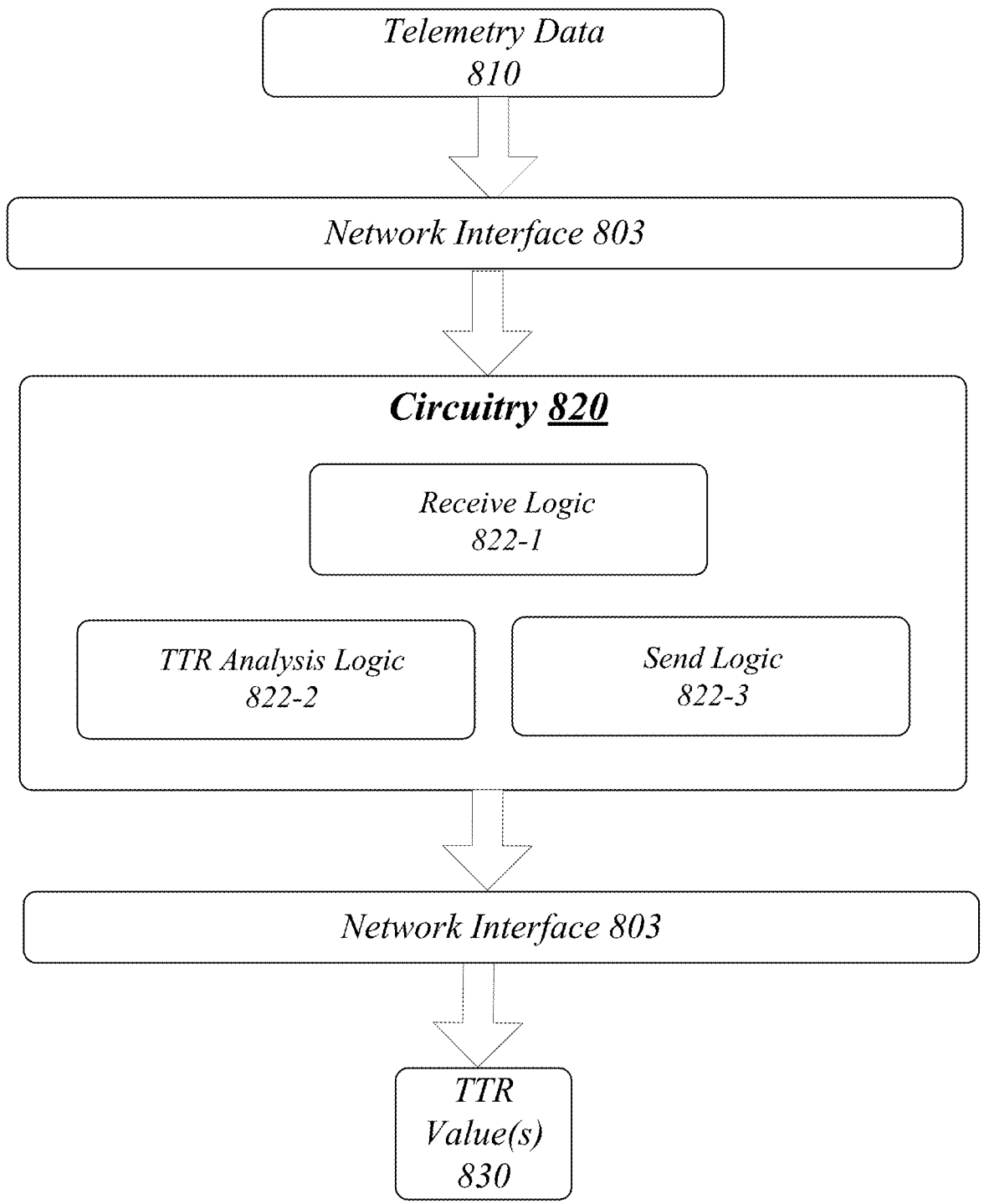
FIG. 8 illustrates an example first apparatus.

FIG. 8 illustrates an example Apparatus 800. Although apparatus 800 shown in FIG. 8 has a limited number of elements in a certain topology, it may be appreciated that apparatus 800 may include more or less elements in alternate topologies as desired for a given implementation.

According to some examples, apparatus 800 may be resident at a management device coupled with a network such as management compute device 120 coupled with network 130 as shown in FIG. 1. Apparatus 800 may be supported by circuitry 820. For these examples, circuitry 820 may be an ASIC, programmable logic chip (e.g., FPGA), processor, processor circuit, or one or more cores of a processor. Circuitry 820 may be arranged to execute logic or one or more software or firmware implemented modules, components or features of the logic. It is worthy to note that "a" and "b" and "c" and similar designators as used herein are intended to be variables representing any positive integer. Thus, for example, if an implementation sets a value for a=4, then a complete set of software or firmware for modules, components of logic 822-a may include logic 822-1, 822-2, 822-3 or 822-4. The examples presented are not limited in this context and the different variables used throughout may represent the same or different integer values. Also, "module", "component" or "feature" may also include software or firmware stored in computer-readable or machine-readable media, and although types of features are shown in FIG. 8 as discrete boxes, this does not limit these types of features to storage in distinct computer-readable media components (e.g., a separate memory, etc.).

According to some examples, apparatus 800 may include a network interface 803 to access or couple with a network (e.g., for a datacenter) and coupled with circuitry 820. For example, to enable logic of apparatus 800 to receive telemetry data from data storage devices and send TRR values to the data storage device, as described more below.

In some examples, apparatus 800 may also include a receive logic 822-1. Receive logic 822-1 may receive telemetry data via network interface 903. The telemetry data may be for multiple data storage devices that includes operating information included in separate snapshots for each data storage device from among the multiple data storage devices. The separate snapshots, for example, may be associated with a first time interval during operation of the multiple data storage devices. For these example, the telemetry data may be included in telemetry data 810.

According to some examples, apparatus 800 may also include a TTR analysis logic 822-2. TTR analysis logic 822-2 may determine individual TTR values for the multiple data storage devices based on the operating information. The individual TTR values may indicate an expected amount of time that a corresponding data storage device is to be at an operational state following a power loss recovery of the corresponding data storage devices.

In some examples, apparatus 800 may also include a send logic 822-3. Send logic 822-3 may send via network interface 803 the individual TTR values to the corresponding data storage devices. For these examples, the sent TTR values may be included in TTR value(s) 830.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 illustrates an example of a logic flow 900. Logic flow 900 may be representative of some or all of the operations executed by one or more logic, features, or devices described herein, such as apparatus 800. More particularly, logic flow 900 may be implemented by one or more of receive logic 822-1, TTR analysis logic 822-2 or send logic 822-3.

According to some examples, logic flow 900 at block 902 may receive telemetry data for multiple data storage devices that includes operating information included in separate snapshots for each data storage device from among the multiple data storage devices, the separate snapshots associated with a first time interval during operation of the multiple data storage devices. For these examples, receive logic 822-1 may receive the telemetry data via network interface 803.

In some examples, logic flow 900 at block 904 may determine individual TTR values for the multiple data storage devices based on the operating information, the individual TTR values to indicate an expected amount of time that a corresponding data storage device is to be at an operational state following a power loss recovery of the corresponding data storage devices. For these examples, TTR analysis logic 822-2 may determine the individual TTR values.

According to some examples, logic flow 900 at block 906 may sending the individual TTR values to the corresponding data storage devices. For these examples, send logic 822-3 may send the TTR values via network interface 803.

FIG. 10 illustrates an example storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
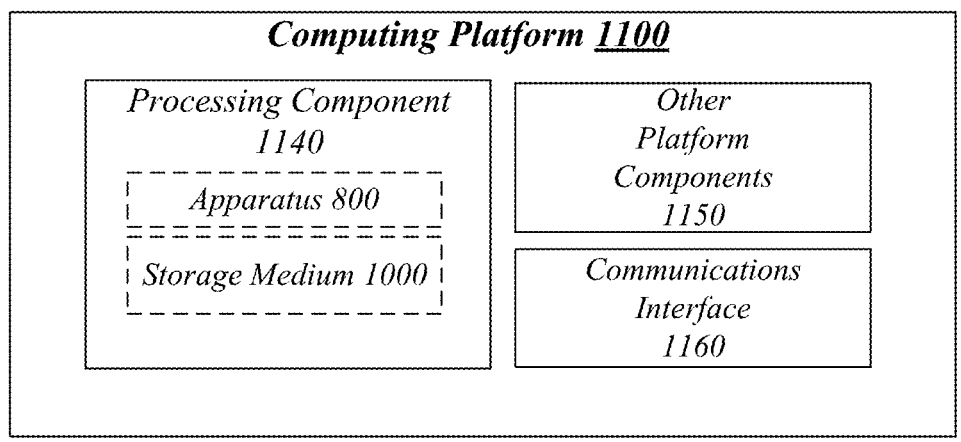
FIG. 11 illustrates an example computing platform.

FIG. 11 illustrates an example computing platform 1100. In some examples, as shown in FIG. 11, computing platform 1100 may include a processing components 1140, other platform components 1150 or a communications interface 1160.

According to some examples, processing components 1140 may execute or implement processing operations or logic for apparatus 800 and/or storage medium 1000. Processing components 1140 may include various hardware elements, software elements, or a combination of both to implement a near-memory processor. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, configurable logic chips or devices (e.g., FPGAs), digital signal processors (DSPs), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by IEEE. For example, one such Ethernet standard promulgated by IEEE may include, but is not limited to, the IEEE 802.3 specification. Network communication may also occur according to one or more Open-Flow specifications such as the OpenFlow Hardware Abstraction API Specification. Network communications may also occur according to one or more Infiniband Architecture specifications.

Computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, ASICs, FPGAs, logic gates and/or single chip architectures. Further, the features of computing platform 1100 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 12:
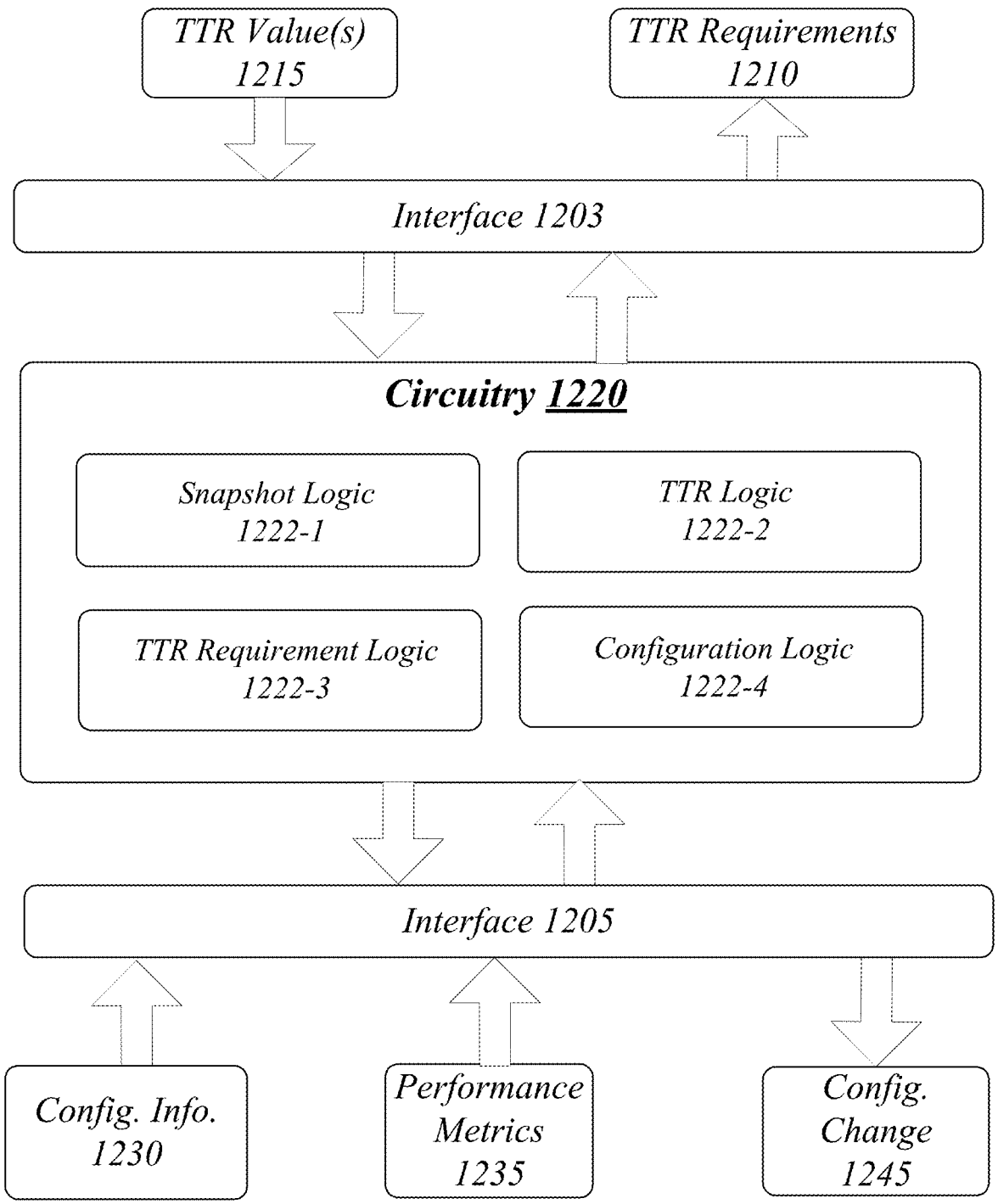
FIG. 12 illustrates an example second apparatus.

FIG. 12 illustrates an example Apparatus 1200. Although apparatus 1200 shown in FIG. 12 has a limited number of elements in a certain topology, it may be appreciated that apparatus 1200 may include more or less elements in alternate topologies as desired for a given implementation.

According to some examples, apparatus 1200 may be resident at a controller for a data storage device such as data storage controller 302 as shown in FIG. 3. Apparatus 1200 may be supported by circuitry 1220. For these examples, circuitry 1220 may be an ASIC, programmable logic chip (e.g., FPGA), processor, processor circuit, or one or more cores of a processor. Circuitry 1220 may be arranged to execute logic or one or more software or firmware implemented modules, components or features of the logic. A "module", "component" or "feature" may also include software or firmware stored in computer-readable or machine-readable media, and although types of features are shown in FIG. 12 as discrete boxes, this does not limit these types of features to storage in distinct computer-readable media components (e.g., a separate memory, etc.).

According to some examples, apparatus 1200 may include an interface 1203 to couple circuitry 1220 with a compute device (e.g., a host interface) and an interface 1205 to couple circuitry 1220 with media or memory dies included in a data storage device. As described more below, interface 1205 may enable logic of apparatus 1200 to receive configuration information or performance metrics related to the media or memory dies and interface 1203 may enable the logic to send TTR values to the compute device.

In some examples, apparatus 1200 may also include a snapshot logic 1222-1. Snapshot logic 1222-1 may obtain first operating information included in a snapshot for a data storage device, the snapshot associated with a first time interval during operation of the data storage device while coupled to a computing device. For these examples, the snapshot may be obtained via receipt of configuration information 1230 and/or performance metric 1235 gathered via interface 1205 over the first time interval.

According to some examples, apparatus 1200 may also include a TTR logic 1222-2. TTR logic 1222-2 may predict, based on the first operating information, a TTR value that indicates an amount of time the data storage device will be at an operational state following a power loss recovery of the data storage device. For these examples, inputs as described above for example equation 1 may be used to predict the TTR value. In some examples, TTR logic 122-2 may send the predicted TTR value to a compute device via interface 1203. The predicted TTR value may be included in TTR value 1215.

In some examples, apparatus 1200 may also include a TTR requirement logic 1222-3. TTR requirement logic 1222-3 may determine whether the predicted TTR value meets a TTR requirement to bring the data storage device to an operational state within a threshold time. For these examples, the TTR requirement may have been sent from the compute device via interface 1203 and be included in TTR requirements 1210.

According to some examples, apparatus 1200 may also include a configuration logic 1222-4. Configuration logic 1222-4 may cause a configuration change to the data storage device based on TTR requirement logic 1222-3 determining that the predicted TTR value indicating that a time to bring the data storage device to the operational state exceeds the threshold time. For these examples, configuration logic 1222-4 may cause a configuration change such as increasing spare space in the media or memory dies via a configuration change command included in configuration change 1245.

FIG. 13 illustrates an example of a logic flow 1300. Logic flow 1300 may be representative of some or all of the operations executed by one or more logic, features, or devices described herein, such as apparatus 1200. More particularly, logic flow 1300 may be implemented by one or more of snapshot logic 1222-1, TTR logic 1222-2, TTR requirement logic 1222-3 or configuration logic 1222-4.

According to some examples, logic flow 1300 at block 1302 may obtain first operating information included in a snapshot for a data storage device, the snapshot associated with a first time interval during operation of the data storage device while coupled to a compute device. For these examples, snapshot logic 1222-1 may the snapshot.

In some examples, logic flow 1300 at block 1304 may predict based on the first operating information, TTR value that indicates an amount of time the data storage device will be at an operational state following a power loss recovery of the data storage device. For these examples, TTR logic 1222-2 may predict the TTR value.

According to some examples, logic flow 1300 at block 1306 may determine whether the predicted TTR value meets a TTR requirement for bringing the data storage device to an operational state within a threshold time. For these examples, TTR requirement logic 1222-3 may make the determination.

In some examples, logic flow 1300 at block 1308 may cause a configuration change to the data storage device based on the predicted TTR value indicating that a time to bring the data storage device to the operational state exceeds the threshold time. For these examples, configuration logic 1222-4 may cause the configuration change.

FIG. 14 illustrates an example storage medium 1400. Storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
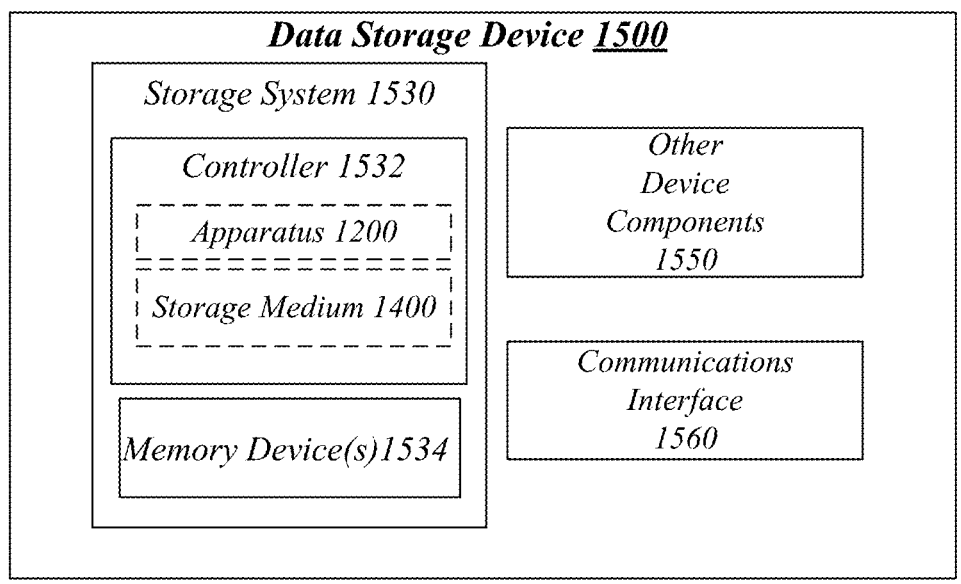
FIG. 15 illustrates an example storage device.

FIG. 15 illustrates an example storage device 1500. In some examples, as shown in FIG. 15, data storage device 1500 may include a storage system 1530, other device components 1550 or a communications interface 1560. According to some examples, data storage device 1500 may be implemented in a type of data storage device such as an SSD.

According to some examples, storage system 1530 may include a controller 1532 and memory devices(s) 1534. Memory device(s) 1534 may include similar types of memory (not shown) that are described above for data storage device 150 shown in FIGS. 1-3. In some examples, controller 1532 may be part of a same die with memory device(s) 1534. Controller 1532 may execute or implement processing operations or logic for apparatus 1200 and and/or medium 1400. Controller 1532 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, configurable logic devices or chips (FPGAs), DSPs, memory units (e.g., SRAM or buffers), logic gates, registers, semiconductor device, chips, microchips, chip sets, and so forth. Examples of software elements may include, but are not limited to, machine programs, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other device components 1550 may include common data storage device elements, such as interfaces, oscillators, timing devices, power supplies, and so forth.

In some examples, communications interface 1560 may include logic and/or features to support a communication interface. For these examples, communications interface 1560 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe specification, the SATA specification, SAS specification or the USB specification. Network communications may occur through a network interface via use of communication protocols or standards such as those described in one or more Ethernet standards promulgated by the IEEE. For example, one such Ethernet standard may include IEEE 802.3-2018.

The components and features of data storage device 1500 may be implemented using any combination of discrete circuitry, ASICs, logic gates and/or single chip architectures. Further, the features of data storage device 1500 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a first interface to couple with a compute device;
a second interface to couple with one or more memory die; and
a controller coupled with the first and second interfaces, the controller to include circuitry to:
obtain first operating information included in a snapshot for a data storage device, the snapshot associated with a first time interval during operation of the data storage device while coupled to a computing device; and predict, based on the first operating information, a time-to-ready (TTR) value that indicates an amount of time the data storage device will be at an operational state following a power loss recovery of the data storage device.

2. The apparatus of claim 1, further comprising the circuitry to:
determine whether the predicted TTR value meets a TTR requirement to bring the data storage device to an operational state within a threshold time; and
cause a configuration change to the data storage device based on the predicted TTR value indicating that a time to bring the data storage device to the operational state exceeds the threshold time.

3. The apparatus of claim 2, further comprising the circuitry to:
obtain second operating information included in a second snapshot for the data storage device, the second snapshot associated with a second time interval during operation of the data storage device following the configuration change to the data storage device; and
predict, based on the second operating information, a second TTR value that indicates a second amount of time the data storage device will be at an operational state following a power loss recovery of the data storage device.

4. The apparatus of claim 2, further comprising:
one or more memory die coupled with the first interface, the one or more memory die to include non-volatile memory.

5. The apparatus of claim 4, the data storage device comprises a solid state drive (SSD), the configuration change to cause an increase in spare space for the non-volatile memory.

6. The apparatus of claim 5, the circuitry to predict the TTR value based on summing a first sub-interval time for initializing hardware at a controller for the SSD, a second sub-interval time for discovery of the SSD by the compute device via the first interface, a third sub-interval for a slow context load and a fourth sub-interval for a fast context load.

7. A method comprising:
obtaining first operating information included in a snapshot for a data storage device, the snapshot associated with a first time interval during operation of the data storage device while coupled to a compute device; and
predicting, based on the first operating information, a time-to-ready (TTR) value that indicates an amount of time the data storage device will be at an operational state following a power loss recovery of the data storage device.

8. The method of claim 7, further comprising:
determining whether the predicted TTR value meets a TTR requirement for bringing the data storage device to an operational state within a threshold time; and
causing a configuration change to the data storage device based on the predicted TTR value indicating that a time to bring the data storage device to the operational state exceeds the threshold time.

9. The method of claim 8, further comprising:
obtain second operating information included in a second snapshot for the data storage device, the second snapshot associated with a second time interval during operation of the data storage device following the configuration change to the data storage device; and
predicting, based on the second operating information, a second TTR value that indicates a second amount of time the data storage device will be at an operational state following a power loss recovery of the data storage device.

10. The method of claim 8, the data storage device comprises a solid state drive (SSD) including non-volatile memory, the configuration change to include increasing spare space in the non-volatile memory.

11. The method of claim 10, predicting the TTR value based on summing a first sub-interval time for initializing hardware at a controller for the SSD, a second sub-interval time for discovery of the SSD by a compute device coupled with the SSD, a third sub-interval for a slow context load and a fourth sub-interval for a fast context load.

12. An apparatus comprising:
an interface to couple with a network; and
circuitry coupled with the interface, the circuitry to:
receive telemetry data via the interface, the telemetry data for multiple data storage devices that includes operating information included in separate snapshots for each data storage device from among the multiple data storage devices, the separate snapshots associated with a first time interval during operation of the multiple data storage devices;
determine individual time-to-ready (TTR) values for the multiple data storage devices based on the operating information, the individual TTR values to indicate an expected amount of time that a corresponding data storage device is to be at an operational state following a power loss recovery of the corresponding data storage devices; and
send via the interface the individual TTR values to the corresponding data storage devices.

13. The apparatus of claim 12, further comprising the circuitry to:
use the individual TTR values to implement a staggered booting scheme that causes at least a first portion of the multiple data storage devices to be powered on first following the power loss recovery, the first portion of the multiple data storage devices having a first expected amount of time to be operational that is lower than a second expected amount of time to be operation for at least a second portion of the multiple data storage devices.

14. The apparatus of claim 13, the multiple data storage devices comprise multiple solid state drives (SSDs) that includes non-volatile memory.

15. The apparatus of claim 14, the circuitry to determine the individual TTR values comprises the circuitry to determine the individual TTR values for each SSD based on summing a first sub-interval time for initializing hardware at a controller for a respective SSD, a second sub-interval time for discovery of the respective SSD by a compute device, a third sub-interval for a slow context load at the respective SSD and a fourth sub-interval for a fast context load at the respective SSD.

16. A method comprising:
receiving telemetry data for multiple data storage devices that includes operating information included in separate snapshots for each data storage device from among the multiple data storage devices, the separate snapshots associated with a first time interval during operation of the multiple data storage devices;
determining individual time-to-ready (TTR) values for the multiple data storage devices based on the operating information, the individual TTR values to indicate an expected amount of time that a corresponding data storage device is to be at an operational state following a power loss recovery of the corresponding data storage devices; and sending the individual TTR values to the corresponding data storage devices.

17. The method of claim 16, further comprising:

using the individual TTR values to implement a staggered booting scheme that causes at least a first portion of the multiple data storage devices to be powered on first following the power loss recovery, the first portion of the multiple data storage devices having a first expected amount of time to be operational that is lower than a second expected amount of time to be operation for at least a second portion of the multiple data storage devices.

18. The method of claim 16, the multiple data storage devices comprise multiple solid state drives (SSDs) including non-volatile memory.

19. The method of claim 18, determining the individual TTR values comprises determining the individual TTR values for each SSD based on summing a first sub-interval time for initializing hardware at a controller for a respective SSD, a second sub-interval time for discovery of the respective SSD by a compute device coupled with the SSD, a third sub-interval for a slow context load at the respective SSD and a fourth sub-interval for a fast context load at the respective SSD.

\* \* \* \* \*